3,345,416
PREPARATION AND REARRANGEMENT OF
BETA-KETOSULFOXIDES
Glen A. Russell, c/o Department of Chemistry, Iowa State University, Ames, Iowa 50010, and Hans-Dieter Becker, P.O. Box 1088, Schenectady, N.Y. 12301
No Drawing. Filed Sept. 4, 1963, Ser. No. 306,604
9 Claims. (Cl. 260—590)

This invention relates to a process for the condensation of dimethyl sulfoxide with aromatic esters to form β-ketosulfoxides. It further relates to the condensation of diethyl phthalate with dimethylsulfoxide (DMSO) to form the 1,3-indandione system and the rearrangement of this compound to ninhydrin. It is also concerned with the intermediates and ultimate products obtained by these processes.

One of the principal objects of the present invention is to provide a novel type of condensation reaction, whereby valuable new products result. These products are β-ketosulfoxides of the general formulae

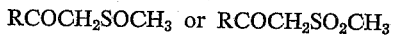

They are variously useful as, for instance, chelating agents for metal ions and as intermediates to undergo the Pummerer rearrangement in the presence of mineral acids to give glyoxals or hemimercaptals of α-ketoaldehydes:

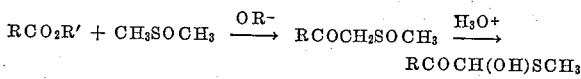

Other objects and advantages of this invention will become apparent from the ensuing disclosure and claims.

These objects are realized by the present invention, which in its broader aspects comprises condensing an aromatic ester with dimethyl sulfoxide in the presence of a strong base. In one preferred embodiment of the invention, diethyl phthalate is used in the DMSO-alkoxide medium to obtain an intramolecular ester condensation leading to the formation of the 1,3-indandione system. The reaction product isolated upon acidification with a mineral acid, e.g. hydrochloric acid, is the α-chlorothioether, i.e. 2-chloro-2-methylmercapto-1,3-indandione. The formation of V from I probably proceeds thus:

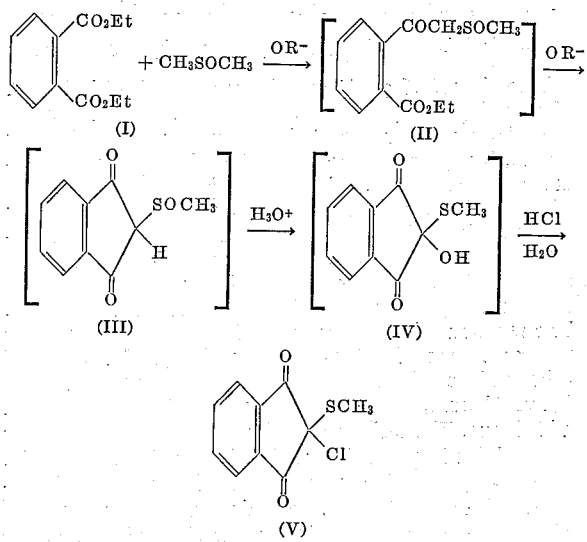

The condensation is best effected by the addition of diethyl phthalate to a solution or suspension of an alkali metal alkoxide in anhydrous dimethyl sulfoxide under an atmosphere of dry, oxygen-free nitrogen. Removal of the solvent by vacuum distillation leaves a salt (presumably the alkali metal salt of III) which is soluble in water. When the aqueous solution of this salt is added to 5 M hydrochloric acid V rapidly precipitates in a high state of purity.

When V is hydrolyzed in boiling water ninhydrin can be isolated in nearly quantitative yields.

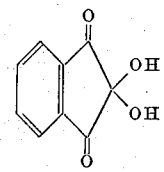

Because of the ease of hydrolysis V cannot be recrystallized from hydroxylic solvents. A color reaction typical of ninhydrin is obtained when V (absorbed on filter paper) is treated with a solution of glycine and heated to 80° C.

It is critical to this invention that the two reactants be substantially anhydrous in order to minimize hydrolysis of the esters. The dimethyl sulfoxide itself may function as the principal solvent medium as well as the reactant. In some cases, however, part of the reaction medium may consist of another organic solvent which is inert to the reactants. For instance, tertiary butyl alcohol as a co-solvent may be advantageous to stabilize the alkaline medium from reaction with oxygen, since dimethyl sulfoxide alone tends to be somewhat unstable. Operable solvent constituents in lieu of tertiary butanol are other alcohols such as methanol, ethanol, and tertiary alcohols in general. Up to about 50% by volume, and usually from 10 to 25%, of the medium may be this type of alcohol.

The solvent medium in which the condensation reactions take place may be made alkaline by use of a number of different types of strong bases. Particularly valuable are the alkali metal oxides, hydroxides, hydrides and alkoxides, e.g. sodium, potassium and lithium methoxides, ethoxides, propoxides and butoxides, the corresponding hydrides, hydroxides and oxides. Preferred proportions of the alkali metal compound range from about 0.1 to 3.0 moles per mole of the aromatic ester to be reacted.

The aromatic esters which may be most successfully condensed by the process of this invention have the general formula $RCO_2R'$. Generally preferred are benzene derivatives having at least one carbon ring in the molecule, for instance benzoates, toluates, phthalates, anisates (p-methoxy-benzoates), salicylates (o-hydroxy-benzoates), naphthoates, and anthroates. The hydrocarbon moiety in these esters, i.e. R' in the above formula, is preferably lower alkyl containing from 1 to 4 carbon atoms, for instance methyl, ethyl, propyl, isopropyl, butyl, and isobutyl. It can be seen from the equation for the reaction hereinbefore given that equimolar proportions of the ester and the dimethyl sulfoxide are desirable to effect complete reaction. Especially where the dimethyl sulfoxide is functioning also as all or part of the reaction medium, an excess of this reactant is best employed.

As usual in chemical reactions, the reaction times and temperatures are interdependent and may readily be adjusted by those skilled in the art, depending on the choice of reactants. It is generally preferred to operate the condensations at temperatures substantially between 20° and 80° C. Depending upon the particular temperature and the particular operation, the times for complete reaction may vary anywhere from about 5 minutes to about 6 hours. Generally the condensation proceeds to completion in from 2 to 4 hours.

Those β-ketosulfoxides that have heretofore been known are recognized as good intermediates for the formation of glyoxals via the Pummerer rearrangement, as hereinbefore indicated. We have found that this rearrangement can be best carried out under mild acid conditions at simply room temperatures, when employing the new β-ketosulfoxides of this invention. The resulting hemimercaptals of glyoxals in aqueous solution give reactions typical of glyoxals, such as osazone formation.

The following examples are given simply to illustrate this invention and not in any way to limit its scope. In these examples all melting points are uncorrected and were obtained using a Fisher-Johns melting point block. The dimethyl sulfoxide was dried over calcium hydride and distilled at a pressure of about 1 mm. (bath temperature 60° C., B.P. 35° C.). Sodium methoxide was used without further purification. The other bases were vacuum sublimed. The normally liquid esters were distilled under vacuum and the solid esters were recrystallized before use.

*Example I.—2-chloro-2-methylmercapto-1,3 - indandione and ninhydrin*

Sodium methoxide (5.4 g., 0.1 mole) was suspended in 75 ml. of anhydrous dimethyl sulfoxide in a 250 ml. round bottomed flask under an atmosphere of nitrogen. The suspension was stirred by a stream of nitrogen introduced by a gas inlet tube extending to the bottom of the flask. Diethyl phthalate (5.5 g., 0.025 mole) was added dropwise to this suspension. The reaction mixture, which turned yellow after about five minutes, was kept under nitrogen for four hours at room temperature after which it was subjected to vacuum distillation at 1 mm. pressure (bath temperature 65–70°) for fifty minutes. To the resulting sticky yellow residue 50 ml. of ethyl ether and 50 ml. of ice water were added. The yellow aqueous layer was separated and added dropwise with stirring to a mixture of 60 ml. of water and 40 ml. of concentrated hydrochloric acid. The colorles precipitate which formed rapidly was removed by filtration and dried under vacuum to give 2-chloro-2-methylmercapto-1,3-indandione, 4.55 g. (80% yield), M.P. 63° C. A sample recrystallized from ether containing a trace of ethanol had a melting point of 63–64° C.

Analysis calcd. for $C_{10}H_7ClO_2S$: C, 52.90; H, 3.25; Cl, 15.44; S, 14.38, mol. wt. 226.6. Found: C, 53.0; H, 3.10; Cl, 15.61; S, 14.13; mol. wt. 226 (dioxane).[1]

The infrared spectrum of this product gave the characteristic indandione absorption at 5.70 and 5.85μ as well as absorption due to the carbon-sulfur bond at 8.05μ. Absorption characteristic of a β-ketosulfoxide at 9.8μ was absent. The integrated nuclear magnetic resonance (60 c.p.s.) spectrum gave aromatic hydrogen (unresolved), intensity 4.0, at 481 cycles relative to tetramethylsilane and methyl hydrogens (singlet) at γ=7.52.

One gram of this 1,3-indandione intermediate was added slowly to 50 ml. of boiling water in a 100 ml. Erlenmeyer flask. The slightly yellow solution was kept on a steam bath for 12 hours during which time most of the water evaporated. The concentrated aqueous solution was transferred to a 50 ml. beaker and evaporated on a steam bath for another hour to yield a crystalline residue which was dried under vacuum. The material thus prepared (775 mg., 99%) had a melting point of 239–240° C. and an infrared spectrum identical with that of commercial ninhydrin.

*Example II.—ω-(Methylsulfinyl)-acetophenone (Ia)*

Potassium (2 g., 51 mmole) was dissolved in 50 ml. of refluxing t-butyl alcohol. After cooling to room temperature 50 ml. of DMSO was added and the solution vacuum distilled (pressure about 2 mm., bath temperature 65–70°) using a Vigreaux column until pure DMSO started distilling (B.P. 42°). Approximately 50 ml. of distillate were collected. To the partially solid residue ethyl benzoate (7.5 g., 50 mmole) was added dropwise at room temperature. The reaction mixture was agitated by a stream of dry, oxygen-free nitrogen for a total of 4 hours. The solvent was then removed by vacuum distillation (1 mm. pressure, bath temperature 75°) during 1.5 hours. Ether (100 ml.) and water (50 ml.) were added to the oily yellowish residue at room temperature. The aqueous layer was separated and acidified to pH 5–6 (indicator paper) with a mixture of 5 ml. of conc. hydrochloric acid and 20 ml. of water. The aqueous solution was extracted with five 200-ml. portions of chloroform. Evaporation of the chloroform yielded a slightly yellow colored oil from which solvent was removed under vacuum at 2 mm. The solid residue obtained was washed with 100 ml. of ether, filtered and dried to give 6.55 g. of Ia as colorless crystals (yield 72%), M.P. 85°.

Analysis calcd. for $C_9H_{10}O_2S$ (182.17); C, 59.33; H, 5.53; S, 17.6. Found: C, 59.62; H, 5.76; S, 17.5.

*Example III.—ω-(Methylsulfinyl)-p-methoxyacetophenone*

The solution of potassium t-butoxide was prepared as described in Example II. To this mixture (containing 51 mmole of potassium t-butoxide) 4.78 g. of methyl p-anisate (28.8 mmole) were added. The reaction mixture was agitated by a stream of nitrogen for four hours at room temperature. Removal of the solvent as described in Example II yielded a yellow colored mass which was shaken with 100 ml. of ether and 50 ml. of water at room temperature. The yellow aqueous layer was covered with an additional 100 ml. of ether and acidified with a mixture of 6 ml. of conc. hydrochloric acid and 24 ml. of water. The desired product precipitated, 220 mg., M.P. 101° C., and was removed by filtration. Evaporation of the ether layer gave 670 mg. (15.3%) of p-anisic acid. The remaining aqueous layer was extracted 6 times with 200-ml. portions of chloroform. Evaporation of the combined chloroform extracts yielded an almost colorless oil which solidified upon treatment with ether to give 3.43 g. of the desired product, M.P. 101°. The mother liquor was evaporated (50° at 3 mm. for 3 hours). The oily residue crystallized at room temperature, yielding additional crude product, M.P. 95–100° C. which was purified by recrystallization from a chloroform-ether mixture. The total yield was 5.01 g., 71%.

Analysis calcd. for $C_{10}H_{12}O_3S$ (212.20): C, 56.60; H, 5.70; S, 15.08. Found: C, 56.72; H, 5.65; S, 15.31.

*Example IV.—ω-(Methylsulfinyl)-p-methylacetophenone*

Potassium (1.6 g., 41 mmole) was dissolved in 70 ml. of refluxing t-butyl alcohol. The excess alcohol was removed by vacuum distillation (pressure approximately 1 mm., bath temperature 65–70°) until the alkoxide residue was nearly dry. Dimethyl sulfoxide (30 ml.) was added and the resultant solution was concentrated by vacuum distillation until approximately 10 ml. of distillate had been collected. To the partially solid residue, methyl p-toluate (3.03 g., 20 mmole) was added dropwise and the mixture was allowed to cool to room temperature. The reaction mixture was agitated by mechanical stirring under a stream of dry, oxygen-free nitrogen for a total of 4 hours. The solvent was then removed by vacuum distillation (1 mm., bath temperature 65–70°) over a period of 2 hours. The residue was dissolved in 50 ml. of water and acidified to pH 6–7 with dilute hydrochloric acid. The aqueous solution was extracted with three 25-ml. portions of chloroform. Evaporation of the chloroform yielded a yellow solid which was washed with 60 ml. of ether, filtered and dried, yielding 2.82 g. of the product (72%) as pale yellow to white crystals, M.P. 105–106° C.

Analysis calcd. for $C_{10}H_{12}O_2S$ (196.27): C, 61.20; H, 6.16; S, 16.34. Found: C, 61.35; H, 6.12; S, 16.50.

---

[1] Determined by the thermoelectric osmometric method; Schwarzkopf Microanalytical Laboratories, Woodside, N.Y.

Example V.—ω-(Methylsulfinyl)-o-hydroxyacetophenone (Id)

Potassium t-butoxide (3.36 g.) was dissolved in 20 ml. of DMSO under a nitrogen atmosphere. Methyl salicylate (1.5 g., 10 mmole) was added slowly at room temperature. The cloudy solution was agitated by a stream of nitrogen for 1 hour. Most of the solvent was then removed within 10 minutes as described in the preparation of Ia. To the remaining residue 5 ml. of water was added followed by a mixture of 4.5 ml. of water and 3 ml. of conc. hydrochloric acid. Extraction with 100 ml. of ether resulted in the formation of colorless needle shaped crystals in the ether layer. The crystalline substance was separated by filtration, washed with ethanol and finally with ether to yield Id, 286 mg. (18%), M.P. 152°. Recrystallization from a hot ethanol-chloroform mixture raised the M.P. to 153°.

Analysis calcd. for $C_9H_{10}O_3S$(198.17): C, 54.54; H, 5.09; S, 16.15. Found: C, 54.77; H, 5.29; S, 16.30.

Example VI.—Methyl hemimercaptal of phenylglyoxal

A solution of potassium t-butoxide was prepared as described in Example II, starting from 4 g. of potassium (10 mmole), 100 ml. t-butanol, and 100 ml. of DMSO. After removal of the excess t-butyl alcohol under vacuum, 15 g. of ethyl benzoate (10 mmole) was added dropwise from a burette to the partially solid mixture of base and DMSO at room temperature with agitation from a stream of nitrogen. After the 40 min. required for the addition of the ester, the reaction mixture was kept at room temperature for an additional 60 min. It was then heated for 60 min. at 60° under a vacuum of about 3 mm. during which time 20 ml. of the solvent distilled. Water (100 ml.) was added to the reaction mixture and the resulting aqueous solution extracted with 100 ml. of ether. The aqueous layer was acidified with a mixture of 30 ml. of conc. hydrochloric acid and 30 ml. of water. After one hour colorless needle shaped crystals started to form. After two days the crystals were removed by filtration, washed with water and dried in a desiccator to yield 15 g. of the desired glyoxal product (82%), M.P. 99–100°. Recrystallization from hot ethanol raised the M.P. to 101°.

Analysis calcd. for $C_{10}H_{12}O_3S$(212.20): C, 56.60; H, 5.70; S, 15.08. Found: C, 56.32; H, 5.78; S, 14.82.

Example VII.—Methyl hemimercaptal of p-methoxyphenylglyoxal

When the product of Example III (400 mg., 1.8 mmole) was dissolved in a solution of 2 ml. of DMSO, 2 ml. of water and 2 ml. of 5 N hydrochloric acid, the solution turned cloudy after about 30 min. at room temperature and crystals started to separate. After two days 330 mg. of the hemimercaptal derivative (82%) as colorless crystals, M.P. 85–90° C., were isolated by filtration. Recrystallization from hot ethanol containing a little water raised the M.P. to 89–91° C.

Analysis calcd. for $C_{10}H_{12}O_3S$(212.2): C, 56.6; H, 5.70; S, 15.1. Found: C, 56.3; H, 5.78; S, 14.8.

Example VIII.—p-Methylphenylglyoxal methyl hemimercaptal

The base was prepared and reacted with the ester as in Example IV. After removal of the solvent by vacuum distillation, the residue was dissolved in 15 ml. of water and acidified with a solution of 10 ml. of concentrated hydrochloric acid diluted to 20 ml. with water. The yellow oil which formed solidified upon standing in the aqueous solution for 4 hours. The pale yellow solid was removed by filtration and air dried to yield 2.81 g. (72%) of the desired glyoxal, M.P. 89–91° C. Upon recrystallization from ethanol-water, colorless needles, M.P. 90–91°, were obtained.

Analysis calcd. for $C_{10}H_{12}O_2S$(196.27): C, 61.20; H, 6.16; S, 16.34. Found: C, 61.58; H, 5.95; S, 16.32.

Example IX.—Glyoxal derivative of ω-(methylsulfinyl) o-hydroxyacetophenone

The ketosulfoxide product of Example V (1.42 g.) was dissolved in 30 ml. of a 1:1 mixture of water and dimethyl sulfoxide. A hydrochloric acid solution (10 ml. of conc. hydrochloric acid plus 10 ml. of water) was added and the cloudy solution which formed immediately was allowed to stand at room temperature for 75 min. The precipitate which formed was filtered, washed with water (50 ml.) and air dried. The filtrates were combined and after standing at room temperature for 18 hours more precipitate formed. The total yield of the desired methyl hemimercaptal product, M.P. 89–91°, was 1.05 g. (74%).

Example X.—Phenylglyoxal methyl mercaptal

The hemimercaptal of Example VI (1 g., 5.48 mmole) was suspended in a mixture of 6 ml. of conc. hydrochloric acid and 3 ml. of water and kept on a steam bath for 10 minutes. Ethanol was added to the solution until the yellow oil which had separated went into solution. On cooling to room temperature the desired product precipitated in the form of fine colorless needle shaped crystals. These were filtered and dried to give 415 mg. of the mercaptal (71%), M.P. 66° C. Recrystallization from hot ethanol raised the M.P. to 66°–67° C.

Analysis calcd. for $C_{10}H_{12}OS_2$(212.2): C, 56.60; H, 5.70; S, 30.20. Found: C, 56.31; H, 5.64; S, 28.98.

Example XI.—o-Hydroxyphenylglyoxal methyl mercaptal

A sample of the hemimercaptal of Example IX (116 mg.) in the form of colorless crystals which had not been recrystallized turned into a brown oil during 2 months of storage. Treatment of this oil with a little ether resulted in the formation of 40 mg. of the corresponding mercaptal (60%) as colorless crystals, M.P. 119–120° C.

Analysis calcd. for $C_{10}H_{12}O_2S_2$(228.2): C, 52.62; H, 5.30; S, 28.02. Found: C, 52.45; H, 5.43; S, 27.80.

Example XII.—Formation of phenyl osazones

The hemimercaptal of Example VI (50 mg.) was dissolved in 1 ml. of ethanol and 0.5 ml. of water. The solution was refluxed for one hour after addition of 0.2 ml. of phenylhydrazine and 2 drops of conc. hydrochloric acid. The yellow colored crystals which separated from the solution were filtered and dried to give 80 mg. (93%) of the phenyl osazones of phenylglyoxal; M.P. 148–149° C.

The osazone of p-methoxyphenylglyoxal was prepared in a similar manner in 91% yield; M.P. 188–189° C., also the osazone of o-hydroxyphenylglyoxal in 27% yield; M.P. 205–206° C.

Analysis calcd. for $C_{20}H_{18}N_4O$(330.38): C, 72.70; H, 5.49; N, 16.96. Found: C, 72.60; H, 5.32; N, 16.66.

The osazone of p-methylphenylglyoxal was prepared in the same manner in 90% yield, M.P. 136–137° C.

Analysis calcd. for $C_{21}H_{20}N_4$(328.21): C, 76.79; H, 6.14; N, 17.07. Found: C, 76.91; H, 5.95; N, 16.97.

Example XIII

The procedure of Example II is repeated four times employing respectively equivalent amounts of n-propyl naphthoate, methyl anthroate, isopropyl benzoate and n-butyl phthalate in lieu of the ethyl benzoate. In each instance the desired β-ketosulfoxide is obtained.

Example XIV

The processes of Examples I through V are repeated, using the following alkali metal bases in lieu of the sodium methoxide or potassium t-butoxide, each at two different concentrations, 0.1 and 3.0 moles per mole of ester: lithium tertiary butoxide, sodium ethoxide, potassium hydroxide, sodium oxide, lithium methoxide, and sodium hydride. In each instance the reaction proceeds smoothly and the desired product is obtained.

The structures of the new compounds described in all of these examples have been confirmed by integrated NMR spectra, taken in chloroform-$d$ at 60 mc. with tetramethylsilane as internal standard.

What is claimed is:

1. A process for the preparation of $\beta$-ketosulfoxides which comprises interreacting dimethyl sulfoxide under substantially anhydrous conditions with an aromatic ester having the formula $RCO_2R^1$ wherein R is phenyl, substituted phenyl, naphthyl or anthryl, the phenyl substituent being methyl, methoxy, carboxy or hydroxy, and $R^1$ is lower alkyl, in the presence of a strong base selected from the class consisting of alkali metal alkoxides, alkali metal hydroxides, alkali metal oxides and alkali metal hydrides.

2. The process of claim 1 wherein the reaction is carried out in a solvent medium consisting essentially of dimethyl sulfoxide and between 0 and about 50% by volume of a tertiary lower alkanol.

3. A process for the preparation of 2-chloro-2-methylmercapto-1,3-indandione, which comprises interreacting dimethyl sulfoxide with diethyl phthalate at a temperature between about 20° and 80° C. under substantially anhydrous conditions, in the presence of a small proportion of an alkali metal alkoxide in an organic solvent medium, removing solvent, dissolving the intermediate reaction product in an aqueous medium, acidifying the resulting solution with a mineral acid, and recovering the said 1,3-indandione product.

4. The process of claim 3 wherein the 2-chloro-2-methylmercapto-1,3-indandione product is hydrolyzed in boiling water and the resulting ninhydrin is recovered.

5. 2-chloro-2-methylmercapto-1,3-indandione.
6. $\omega$-(Methylsulfinyl)-acetophenone.
7. $\omega$-(Methylsulfinyl)-p-methoxyacetophenone.
8. $\omega$-(Methylsulfinyl)-p-methylacetophenone.
9. $\omega$-(Methylsulfinyl)-o-hydroxyacetophenone.

References Cited

UNITED STATES PATENTS 2,310,949  2/1943  Ford et al. _____ 260—590
2,313,621  3/1943  Bruson _____ 260—590

OTHER REFERENCES

Bloomfield: J. Org. Chem. 27, 2742–2746 (1962).
Griesbaum et al.: J. Am. Chem. Soc. 85, 1969–1974 (1963).
Kipnis et al.: J. Am. Chem. Soc. 74, 1068–1069 (1953).

LEON ZITVER, *Primary Examiner.*

D. D. HORWITZ, *Assistant Examiner.*